United States Patent [19]

Inaba et al.

[11] Patent Number: 4,734,020

[45] Date of Patent: Mar. 29, 1988

[54] SCROLL TYPE COMPRESSOR WITH SPIRAL OIL FEEDING GROOVES IN THRUST BEARING

[75] Inventors: Tsutomu Inaba; Masahiro Sugihara; Norihide Kobayashi, all of Wakayama, Japan

[73] Assignee: Mitsubishi Denki Kabushiki Kaisha, Tokyo, Japan

[21] Appl. No.: 939,110

[22] Filed: Dec. 8, 1986

[30] Foreign Application Priority Data

Dec. 16, 1985 [JP] Japan .................................. 60-284616

[51] Int. Cl.⁴ ........................ F04C 18/04; F04C 29/02; F16C 33/10
[52] U.S. Cl. ...................................... 418/55; 418/88; 418/94; 384/369
[58] Field of Search ............................ 418/55, 88, 94; 184/6.16, 6.18; 384/123, 369

[56] References Cited

U.S. PATENT DOCUMENTS

| | | | |
|---|---|---|---|
| 3,376,083 | 4/1968 | Muijderman | 384/123 |
| 4,065,279 | 12/1977 | McCullough | 62/510 |
| 4,362,343 | 12/1982 | Visser | 384/123 |
| 4,380,355 | 4/1983 | Beardmore | 384/123 |

FOREIGN PATENT DOCUMENTS

| | | |
|---|---|---|
| 0157390 | 10/1985 | European Pat. Off. . |
| 1155939 | 4/1964 | Fed. Rep. of Germany . |
| 1189786 | 11/1965 | Fed. Rep. of Germany . |
| 227197 | 9/1985 | German Democratic Rep. . |
| 58-113593 | 7/1983 | Japan . |

*Primary Examiner*—John J. Vrablik
*Attorney, Agent, or Firm*—Oblon, Fisher, Spivak, McClelland & Maier

[57] ABSTRACT

An improved scroll type compressor which is provided with a thrust bearing of high operational reliability, wherein the thrust bearing has a plurality of oil-feeding grooves in the spiral form formed in the surface part of the bearing so as to prevent it from seizure or wear.

2 Claims, 13 Drawing Figures

SCROLL TYPE COMPRESSOR WITH SPIRAL OIL FEEDING GROOVES IN THRUST BEARING

BACKGROUND OF THE INVENTION

1. FIELD OF THE INVENTION

The present invention relates to a scroll type compressor to be used for compressing refrigerant or cooling medium for refrigerators, air-conditioners, and so forth, or compressing air or other gases.

2. DESCRIPTION OF PRIOR ARTS

In the following, explanations will be given in reference to FIGS. 3(a), 3(b), 3(c), 3(d), 4, 5, 6, 7(a), 7(b), 7(c) and 8 of the accompanying drawing as to the general principle concrete construction, and operations of conventional scroll type compressor.

Each of FIGS. 3(a), 3(b), 3(c) and 3(d) illustrates those essential structural elements of the scroll type compressor and the principle of compression in such scroll type compressor.

In these figures of drawing, a reference numeral 1b designates a wrap plate constituting a stationary scroll, a reference numeral 2b represents a wrap plate constituting an orbiting scroll, a numeral 5 refers to a compression chamber defined in a space gap between the stationary scroll wrap plate 1b and the orbiting scroll wrap plate 2b, a numeral 6 refers to an inlet chamber, and a reference numeral 3 denotes an outlet port formed in the innermost periphery of the scroll type compressor. A reference letter O designates the center of the stationary scroll. Both stationary scroll wrap plate 1b and orbiting scroll wrap plate 2b are in the same spiral shape such as an involute curve, an arc, and so forth, and are combined together in the state of their being mutually offset with a phase of 180 degrees to thereby define the compression chamber 5. In such state, the orbiting scroll 2b alone is caused to perform the so-called "orbiting motion" at is respective moving phases of 0°, 90°, 180° and 270° as shown in FIGS. 3(a), 3(b), 3(c) and 3(d), wherein it revolves around the center O of the stationary scroll wrap plate 1b, while maintainng its constant angular posture, i.e., without performing its rotational motion of its own axis. With such orbiting motion, the compression chamber 5 sequentially reduces its volume, and the gas taken into the compression chamber 5 from the inlet chamber 6 is discharged outside through the outlet port 3 at the center of the stationary scroll wrap plate 1b.

Figure 4:
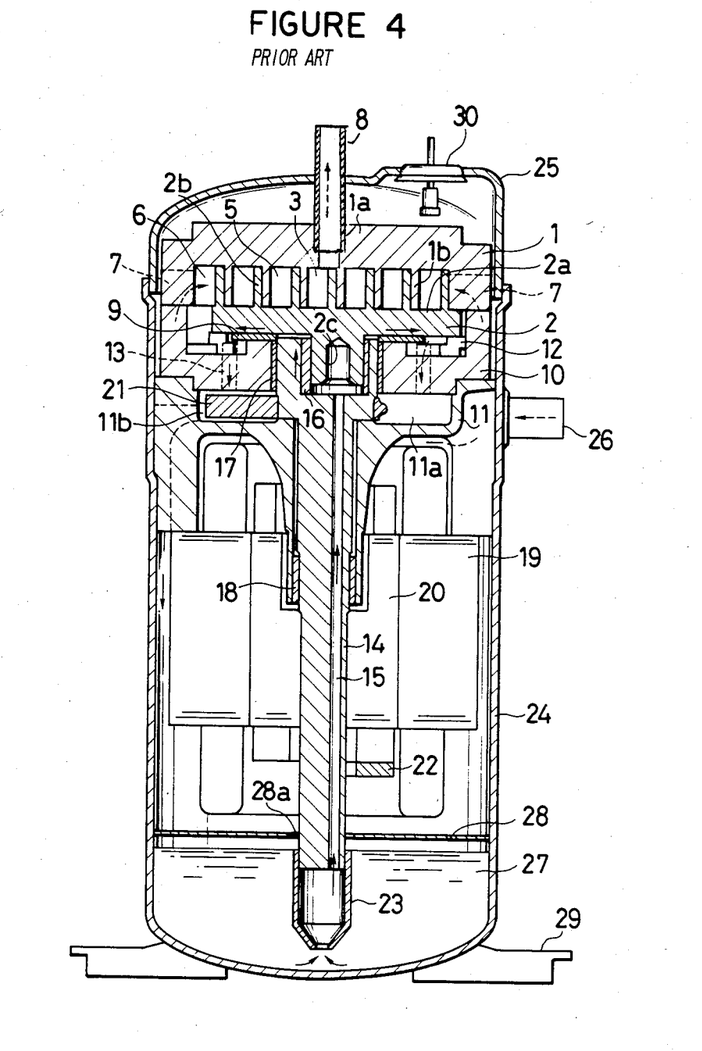
FIG. 4 is a longitudinal cross-sectional view showing the entire structure of a conventional scroll type compressor.

FIG. 4 illustrates a prior art scroll type compressor as disclosed in Japanese Patent application No. 64571/1984, which is a concrete example of a case, wherein the scroll type compressor is to be applied, for example, to a refrigerator, an air conditioner, and so forth, in which it is adapted to be a compressor for a gas such as Freon, etc.

In FIG. 4, a reference numeral 1 designates a stationary scroll; a numeral 1a refers to a base plate of the stationary scroll 1; a numeral 1b refers to a wrap plate of the stationary scroll 1; a reference numeral 2 represents an orbiting scroll; 2a denotes a base plate of the orbiting scroll 2; a numeral 2b refers to a wrap plate of the orbiting scroll 2; a numeral 2c refers to a shaft for the orbiting scroll 2; a numeral 5 denotes a compression chamber; a numeral 6 represents an intake chamber within the compression chamber 5; a numeral 7 refers to a suction port formed in the outer periphery of the stationary scroll 1; a numeral 8 denotes an outlet tube; a reference numeral 3 represents an outlet chamber; a numeral 9 a thrust bearing to support the lower surface of the base plate 2a of the orbiting scroll 2; a numeral 10 an upper bearing support for supporting a main shaft 14 through a main bearing 17 to be described later; 11 a lower bearing support for supporting the main shaft 14 through a lower main bearing 18 to be also described later; 11a a balancer chamber defined in the lower bearing support 11; and 11b an oil returning port, through which lubricating oil is discharged from the balancer chamber 11a. The stationary scroll 1, the bearing support 10 and the bearing support 11 are coaxially assembled with pins (not shown in the drawing) or socket-and-spigot joints, and are fastened together with bolts, etc. (also not shown in the drawing). A reference numeral 12 designates an Oldham's coupling which is a rotation-preventing mechanism for preventing the orbiting scroll 2 from its rotational motion on its own axis and causing it to revolve (i.e. to perform the orbiting motion); a reference numeral 13 represents an oil-returning port; a reference numeral 14 represents a crank shaft (i.e., a main shaft) for driving the orbitng scroll 2; a numeral 15 refers to an oil-feeding port bored in and through the axial direction of the main shaft 14 in eccentricity from the center axis; a numeral 16 refers to an orbiting bearing which is mounted on the upper end of the main shaft 14 in eccentricity from its axial center for a predetermined quantity; 17 refers to the upper main bearing which is fixed in the upper bearing support 10 by press-insertion, or other expedients to rotatably support the upper part of the main shaft 14; 18 refers to the lower main bearing which is fixed in the lower bearing support 11 by press-insertion, or other expedients to rotatably hold the lower part of the main shaft 14; a reference numeral 19 designates a stator for an electric motor, which is fixed to the lower bearing support 11 with bolts, etc.; a numeral 20 refers to a rotor for the electric motor, which is fixed to the main shaft 14 by press-insertion, shrink-fit, or other expedients; a reference numeral 21 denotes a first balancer which is fixed on the main shaft 14 by shrink-fit, or other expedients; a numeral 22 represents a second balancer mounted on the lower end part of the rotor 20 for the electric motor; and 23 refers to an oil pump fixed at the bottom end of the main shaft 14 by shrink-fit, or other expedients.

A reference numeral 24 designates a lower shell, into which the above-listed each and every component member is housed and fixed; a reference numeral 25 denotes an upper shell to be fitted into the top open end of the lower shell 24 and to tightly seal the overall compressor by welding of the fitted part between the upper and lower shells. The fixing of the component members for the compressor placed in the lower shell 24 is done by press-insertion or shrink-fit of the outer peripheral member of the lower bearing support 11.

A reference numeral 26 designates an inlet tube which is provided at one part on the lateral side of the lower shell 24, through which an inlet gas is introduced into the shell interior from its lower part; a numeral 27 refers to an oil sump at the bottom part of the lower shell 24; a numeral 28 refers to a baffle plate which is disposed over the oil sump 27 and fixed to the lower shell 24, a hole 28a being formed at its center to permit the main shaft 14 to pass through it; a reference numeral 29 denotes feet for supporting the entire compressor, all of which are fixed to the outer bottom part of the lower shell 24 by welding; and a numeral 30 represents a glass connecting terminal which is fixed on the top part of the upper shell 25 by means of a ring projection, etc., to which an electrical lead wire (not shown in the drawing) from the stator 19 of the electric motor is connected.

Figure 5:
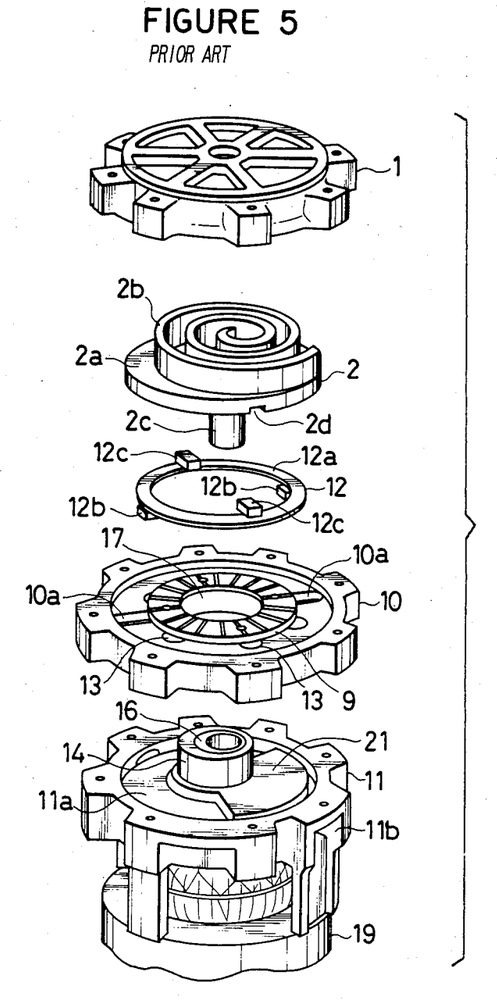
FIG. 5 is an exploded perspective view showing the main part of the conventional scroll type compressor shown in FIG. 4.

FIG. 5 is an exploded perspective view of the main part of the compressor shown in FIG. 4. In FIG. 5, a reference numeral 2d designates an Oldham's groove which is formed in pair in the diametral direction on the lower surface of the base plate 2a of the orbiting scroll 2 opposite to the surface where the wrap plate 2b thereof is provided; 12a refers to a ring member for the Oldham's coupling 12; 12b denotes a key provided in pair in the diametral direction on the lower surface side of the ring member 12a; and 12c represents a key provided in pair in the diametral direction on the upper surface side of the ring member 12a, but in the direction orthogonal to the pair of keys 12a on the lower surface thereof. A reference numeral 10a designates Oldham's groove provided in pair in the diametral direction on the upper bearing support 10.

Figure 6:
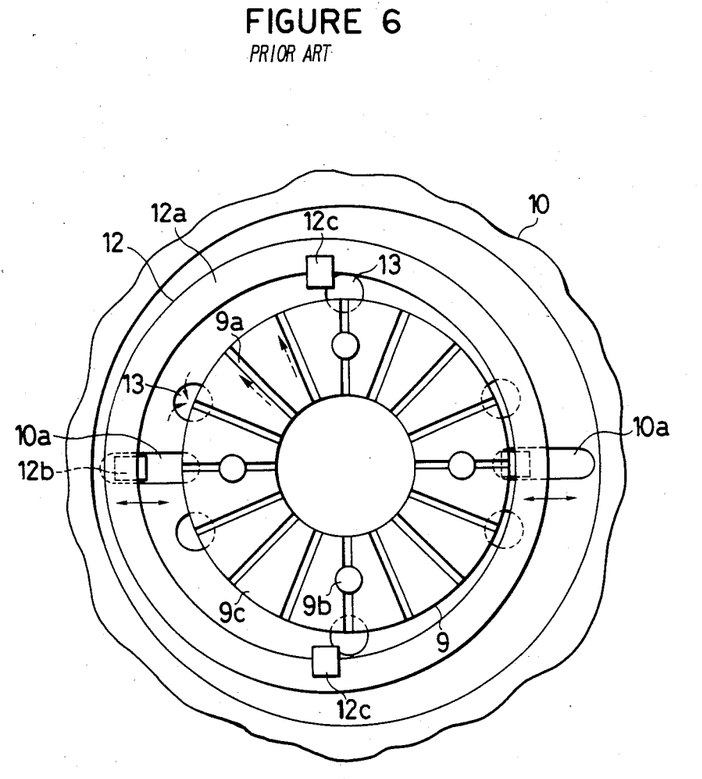
FIGS. 6 and 8 are respectively plan views illustrating the thrust bearing for the conventional scroll type compressor for explaining their functions.

FIG. 6 is a top plan view showing the assembly of the Oldham's coupling 12 and the upper bearing support 10. In FIG. 6, a reference numeral 9a designates a plurality of oil-feeding grooves formed radially on the upper surface of the thrust bearing 9, which constitutes the bearing surface, in full length in the radial direction and at an equal angular interval in the peripheral direction; and a numeral 9b refers to screws which fix the thrust bearing 9 to the upper bearing support 10. A reference numeral 9c represents a so-called "pad" for receiving a thrust load generated between the adjacent oil-feeding grooves 9a. As shown in FIG. 6, the Oldham's coupling 12 is constructed in such a way that the pair of keys 12b may be slidably fitted in the pair of Oldham's grooves 10a formed in the upper bearing support 10, while the other pair of keys 12c may also be slidably fitted in the pair of Oldham's grooves 2d formed in the lower surface of the base plate 2a of the orbiting scroll 2. The Oldham's coupling 12 performs the reciprocating motion with respect to the upper bearing support 10 in the direction shown by an arrow mark in solid line in FIG. 6, while the orbiting scroll 2 is permitted to do its motion in the direction orthogonal to the reciprocating motion of the Oldham's coupling. As the result of this, the orbiting scroll 2 becomes able to move, while it is maintaining a constant angular posture with respect to the upper bearing support.

When the electric power is fed to the scroll type compressor of the above-described construction, rotational force is imparted to the main shaft 14 by the drive force generated from the stator 19 and the rotor 20 of the electric motor, and this rotational force is transmitted to the orbiting scroll 2 through the orbiting bearing 16. When the rotational force is transmitted to the orbiting scroll 2, it performs the so-called "orbiting motion", by which it moves while it is maintaining a constant angular posture with respect to the upper bearing support 10 as described in the preceding, as the consequence of which there is effected the compression operation as indicated in FIGS. 3(a), 3(b), 3(c) and 3(d). During this compression operation, the gas is sucked into the compressor through the inlet tube 26, as shown by an arrow mark in broken line, and, after cooling the top part of the stator 19 of the electric motor, it passes through a path (not shown in the drawing) in the outer periphery of the upper bearing support 10 and is sucked into the intake chamber 6 through the inlet port 7 formed in the stationary scroll 1. Thereafter, the gas is compressed in the above-mentioned manner, and discharged outside through the outlet tube 8.

During operation of the compressor, the oil 27 in the lower shell 24 is sucked from the top end of the oil pump 23, pumped upward in and through the oil-feeding path 15 by the centrifugal force generated from rotation of the main shaft 14, and fed, in its one part, to the lower main bearing 18, after which the remaining part thereof is fed to the orbiting bearing 16 and the upper main bearing 17. After it has been fed to the orbiting bearing 16 and the upper main bearing 17, oil passes through the oil-feeding grooves 9a in the thrust bearing 9, and is discharged from the inner peripheral side of the thrust bearing 9 to the outer periphery thereof. The oil which has been let out to the outer periphery of the thrust bearing 9 is prevented from its outflow into the inlet chamber 6 due to a small clearance between the base plate 2a of the orbiting scroll 2 and the Oldham's coupling 12, then drops down into the balancer chamber 11a from the oil-returning port 13. Thereafter, it passes through another oil-returning port 11b to drop in and through the lower shell 24, and goes back to the bottom of the lower shell 24 through the hole 28a formed in the baffle plate 28.

Figure 7A:
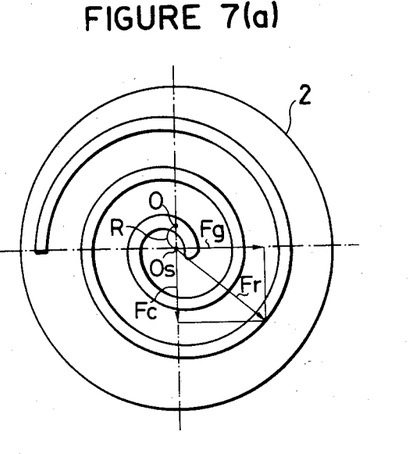
FIGS. 7(a), 7(b) and 7(c) are respectively a plan view, a side view indicating force which acts on the orbiting scroll, and a schematic view for explaining the surface pressure which acts on the thrust bearing.
Figure 7B:
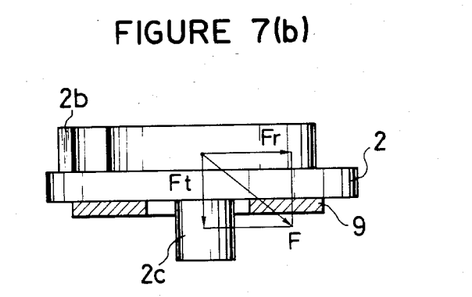
Figure 7C:
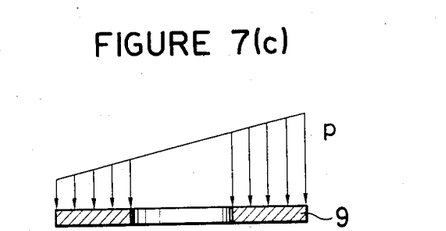

FIGS. 7(a), 7(b) and 7(c) illustrate the force which acts on the orbiting scroll in the scroll type compressor constructed in the above-mentioned manner. In the drawing, a reference letter O designates the center of the main shaft (i.e., the center of rotation of the mainshaft); a reference letter Os represents the center of the orbiting scroll 2 (i.e., the center of the shaft 2c of the orbiting scroll 2); and a letter R refers to a distance between Os and O (i.e., the orbiting radius of the orbiting scroll 2). Further, a reference letter Fc designates the centrifugal force acting on the orbiting scroll 2; a letter Fg refers to the force of gas in the radial direction, which also acts on the orbiting scroll 2 by the compression operation; and a letter Fr denotes a resultant force of Fg and Fc. A reference letter Ft designates the force of gas in the axial direction, which acts on the orbiting scroll 2 by the compression operation (i.e., the thrust force); and a letter F refers to a resultant force of Fr and Ft.

The forces Fc and Fg are in the direction orthogonal to the orbiting scroll shaft 2c, that is, the radial force; hence Fr is also the radial force. On the other hand, Ft is in the direction parallel to the orbiting scroll shaft 2c, that is, the axial force. Consequently, the resultant force F will act on the orbiting scroll shaft 2c in the diagonally lower direction as shown in FIG. 7(b). Thus, on account of the force F in the diagonally lower direction, the surface pressure P which the orbiting scroll 2 imparts to the thrust bearing 9 is not uniform, but assumes a distribution as shown in FIG. 7(c), that is, a distribution of the surface pressure which has inclination in a certain direction. In other words, the maximum pressure distribution appears in the direction of the force Fr, while the minimum pressure distribution appears in the opposite direction to the force Fr.

In the following, explanations will be given in reference to FIGS. 8 as to how this non-uniformity in the thrust force acts on the thrust bearing 9.

Figure 8:
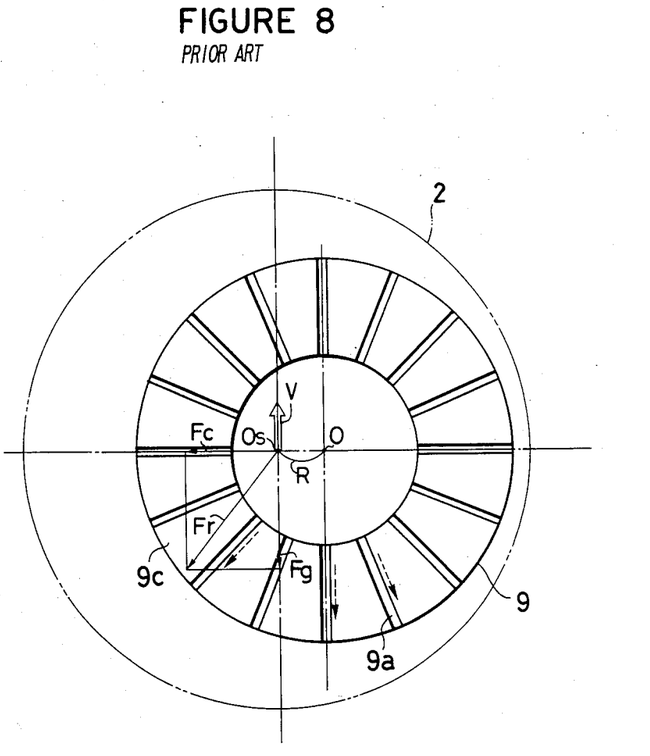

FIG. 8 illustrates the direction of the force which acts on the orbiting scroll 2 positioned on the thrust bearing 9. In FIG. 8, O and Os are respectively the center of rotation of the main shaft and the center of the orbiting scroll 2, as in FIG. 7. A reference numeral 9c designates pressure receiving parts (i.e. pads) which are provided in a plurality of numbers on the thrust bearing 9.

In FIG. 8, the orbiting scroll 2 is shown to be eccentric to the left direction in the drawing (i.e., the direction of the force Fc) with respect to the rotational center O of the main shaft. The direction of the movement in this state is represented by an arrow mark V in the drawing. That is to say, the orbiting scroll 2 at this instant is shifted to the direction of the arrow mark V with repsect to the thrust bearing 9 at its every point. On the other hand, the surface pressure which acts on the thrust bearing 9 is maximum in the direction of the force Fr, as already mentioned in the foregoing. Accordingly, the maximum surface pressure acts on the pads 9c in the direction of the force Fr, and the orbiting scroll is shifted to the arrow mark direction V.

With the operation of the compressor, the center Os of the orbiting scroll in FIG. 8 revolves around the center O, with which rotation the directions of the forces Fc Fg and Fr also revolve, and, further, the moving direction V also revolves. Accordingly, at any time instant during the operation of the compressor, there is no change in the direction of the surface pressure to be generated in the orbiting scroll 2 and the thrust bearing 9.

In the scroll type compressor as described above, it is essential that the thrust bearing 9 be prevented from seizure or wear, same as the main bearing, so as to secure its stable operation over a long period of time. For this purpose, it is required that the lubricating oil may be smoothly introduced into each and every pad 9c of the thrust bearing 9 through the oil-feeding grooves 9a by the movement of the orbiting scroll 2 so that satisfactory oil film may be formed on the pads by the so-called "wedging effect". Since the wedging effect itself occurs naturally by a difference in temperature between inside and outside of the pads, and so forth, and the general theory of such effect has already been established, no detailed explanations will be given herein.

In such thrust bearing as mentioned above, the pads 9c, on each of which the oil film has been formed to the maximum degree, are in the direciton where the maximum surface pressure is generated (i.e., in the direction of the force Fr). However, in the conventional thrust bearing 9 sectioned by the radial oil-feeding grooves 9a, since the pads 9c in the direction of the force Fr have their oil-feeding grooves 9a formed in inclination with respect to the moving direction (i.e., the direction V), the uniform introduction of the lubricating oil to the entire surface of the pads does not take place. In particular, when the compressor is operated at a low speed by the capacitive control motion, etc., the centrifugal force Fr becomes decreased, owing to which the direction of the force Fr comes closer to the direction of the force Fg. Also, in the scroll type compressor of a construction wherein the wrap plate of the orbiting scroll and the wrap plate of the stationary scroll are brought into mutual contact in the radial direction to attain sealing of the compression chamber, the centrifugal force Fc is borne by the wrap plate of the stationary scroll, on account of which the forces Fr and Fg become identical. In this way, when the forces Fr and Fg come closer to each other or become identical, the above-mentioned tendency will be further increased to make it difficult to introduce the lubricating oil into the pads in the direction of the force Fr and to form the oil film. Under the operating conditions of the compressor wherein the surface pressure becomes the maximum, it may happen that no oil layer is formed to inevitably cause seizure or wear of the thrust bearing to occur.

As has been described in the foregoing, with the thrust bearing of the conventional scroll type compressor, the operational reliability of the thrust bearing was the problem.

OBJECT OF THE INVENTION

It is therefore an object of the present invention to provide an improved scroll type compressor of high operational reliability, in which the above-mentioned various problems are solved with increased reliability of the thrust bearing.

SUMMARY OF THE INVENTION

According to the present invention, in general aspect of it, there is provided a scroll type compressor, which comprises in combination: (a) stationary scroll and an orbiting scroll, each of which is constructed with a base plate and a wrap plate in a spiral shape such as involute, etc. projectively provided on the surface of said base plate, both said scrolls defining a compression chamber by being mutually combined in an offset relationship; (b) a main shaft which holds a shaft for said orbiting scroll provided at a side opposite to the wrap plate of said orbiting scroll by offsetting said shaft for a predetermined quantity to cause said orbiting scroll to perform the orbiting motion; (c) a thrust bearing which holds the surface of said base plate of said orbiting scroll at the side opposite to the surface where said wrap plate is provided; (d) a bearing support means, in which main bearings for supporting said main shaft and said thrust bearing are provided; (e) a rotation-preventing mechanism which prevents said orbiting scroll from rotating on and around its axis, and causes the same to revolve around said main bearing; (f) an oil path which is bored in and through said main shaft to define an oil-feeding port, and which is open to an oil sump where the bottom end of said main shaft is immersed, and which feeds lubricating oil to said main bearing and said thrust bearing; and (g) a plurality of oil feeding grooves in a spiral shape formed on the surface of said thrust bearing.

The foregoing object, other objects as well as the specific construction and operations of the scroll type compressor according to the present invention will become more apparent and understandable from the following detailed description thereof, when read in conjunction with the accompanying drawing.

DETAILED DESCRIPTION OF THE PREFERRED EMBODIMENTS

The scroll type compressor according to the present invention has its improvement in that a plurality of non-radial oil-feeding grooves are formed in the surface of the thrust bearing.

By providing a plurality of the oil-feeding grooves in the spiral form in the surface part of the thrust bearing for the scroll type compressor according to the present invention, introduction of the lubricating oil into the pads in the direction of the maximum surface pressure of the thrust bearing at every crank angle of the orbiting scroll can be readily attained, which facilitates formation of the oil film thereon to prevent any seizure or wear of the thrust bearing from taking place with the consequent improvement in the operational reliability of the thrust bearing, hence the improvement in the scroll type compressor as a whole.

For better understanding of the present invention, two preferred embodiments of the scroll type compressor will be described in the following.

Figure 1:
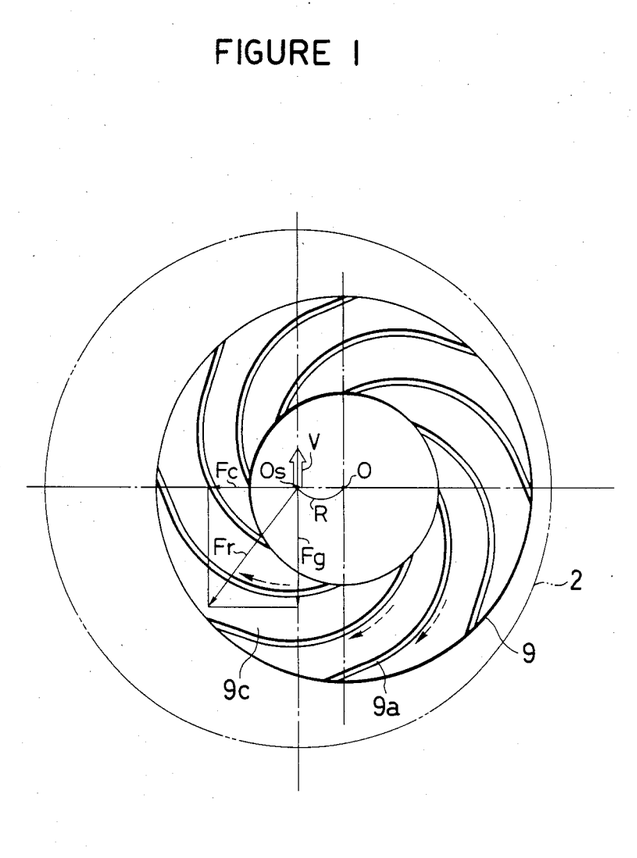
FIG. 1 is a plan view showing the thrust bearing for the scroll type compressor according to one embodiment of the present invention.

FIG. 1 illustrates the thrust bearing of one embodiment of the scroll type compressor according to the present invention. In the drawing, a reference numeral 9a designates the oil-feeding grooves, each being formed in the involute curve derived from a predetermined base circle. A plurality of grooves are provided in point symmetry. A numeral 9c refers to the pads formed between the adjacent oil-feeding grooves. The other reference numerals are identical with those in FIG. 8.

In the thrust bearing 9 of the embodiment constructed as such, the lubricating oil flows through the oil-feeding grooves 9a as shown by the arrow marks in broken lines, and then is discharged to the outer periphery of the thrust bearing 9, same as in the conventional thrust bearing. In this instance, however, since the oil-feeding grooves 9a are in the spiral form, they are to be formed in the direction substantially perpendicular to the sliding direction V of the orbiting scroll with respect to those pads 9c which are in the direction of the maximum thrust surface pressure. Accordingly, those pads in the direction of the maximum surface pressure readily introduce thereinto the lubricating oil on account of which the oil film can be formed easily. And yet, in comparison with the conventional thrust bearing, the pads 9c in the direction of the maximum surface pressure are formed in a large size in the vertical direction with respect to their moving direction, which also adds advantage in the formation of the oil film.

By the operation of the compressor, the center Os of the orbiting scroll 9 revolves around the rotational axis O of the main shaft along with the pads in the maximum thrust surface pressure. However, since the oil-feeding groove 9a of the thrust bearing 9 is formed in a plurality of numbers and in point symmetry, the oil film can be easily produced on the pads in the direction of the maximum surface pressure at any position of the crank angle. Accordingly, the thrust beraing is free from seizure or wear, whereby the operational reliability of the compressor can be improved.

Figure 2:
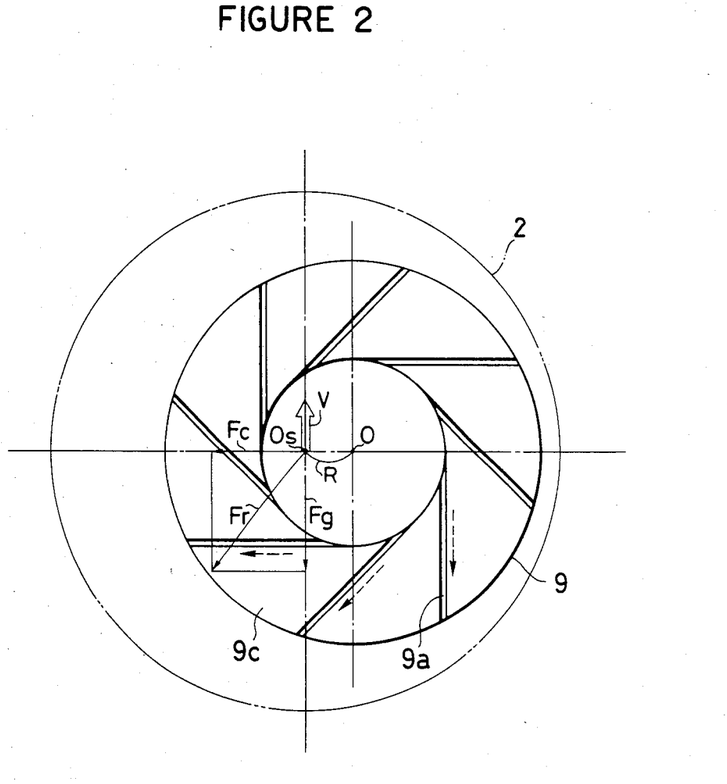
FIG. 2 is also a plan view showing the thrust bearing according to another embodiment of the present invention.
Figure 3A:
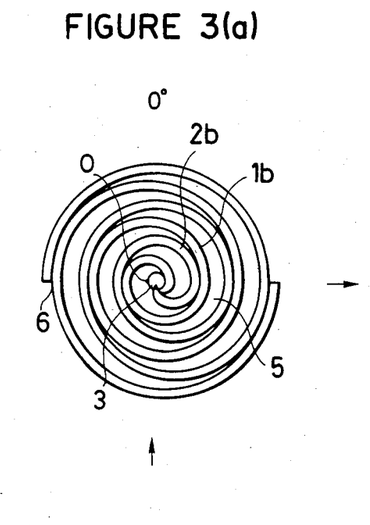
FIGS. 3(a), 3(b), 3(c) and 3(d) are respectively schematic diagrams for explaining the principle of the scroll type compressor.
Figure 3B:
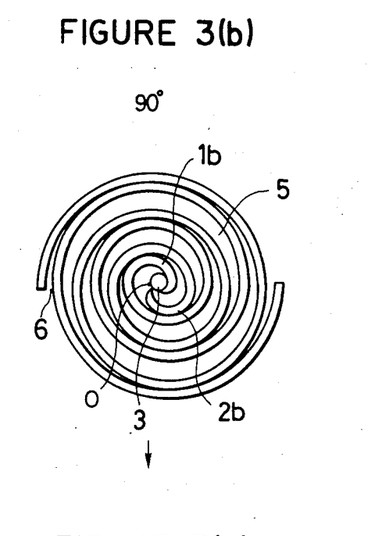
Figure 3C:
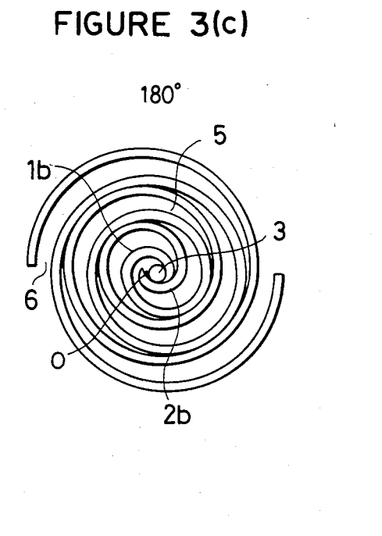
Figure 3D:
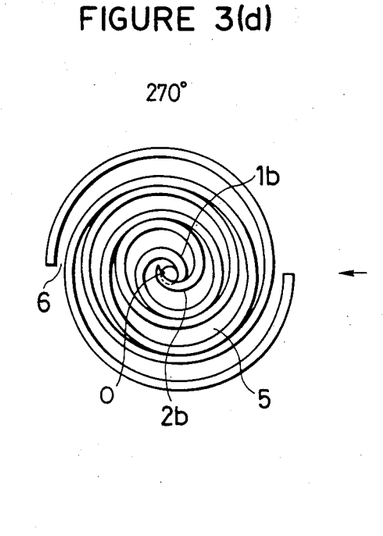

In the following, the second embodiment of the present invention will be described hereinbelow in reference to FIG. 2.

In the drawing, a reference numeral 9a designates the oil-feeding grooves formed in the thrust bearing 9. The oil-feeding grooves 9a are provided in a plurality of numbers and in the rectilinear shape formed tangentially to the inscribed circle of the thrust bearing 9. A numeral 9c refers to the pads formed between the adjacent oil-feeding grooves 9a. By the way, while the oil-feeding grooves 9a may not always be in contact with the inscribed circle of the thrust bearing 9, this way of contact would produce the maximum effect, for which reason this mode is taken as an example. With this second embodiment, the same effect as that of the first embodiment shown in FIG. 1 can be expected.

The other construction and operations of the scroll type compressor of the present invention other than those mentioned in the above two embodiments are identical with the conventional scroll type compressor as shown in FIGS. 3 to 8.

As has been described in the foregoing, the present invention effectively provides the improved scroll type compressor having high operational reliability, which is free from seizure or wear of the thrust bearing, and which can be realized by providing a plurality of the oil-feeding grooves in the spiral form on the surface of the bearing.

Although, in the foregoing, the present invention has been described with particular reference to the preferred embodiments thereof, it should be understood that these embodiments are illustrative only and not so restrictive, and that any changes and modifications may be made by those persons skilled in the art within the spirit and scope of the invention as recited in the appended claims.

What is claimed is:

1. A scroll type compressor which comprises in combination:
(a) a stationary scroll and an orbiting scroll, each of which is constructed with a base plate and a wrap plate in a spiral form projectively provided on the surface of said base plate, both said scrolls defining a compression chamber by being mutually combined in an offset relationship;
(b) a main shaft which holds a shaft for said orbiting scroll provided at a side opposite to the wrap plate of said orbiting scroll by offsetting said shaft for said orbiting scroll for a predetermined quantity to cause said orbiting scroll to perform the orbiting motion, said main shaft being rotatably received in a main bearing;
(c) a thrust bearing which holds the surface of said base plate of said orbiting scroll at the side opposite to the surface where said wrap plate is provided, said thrust bearing having a center point O and a center opening for receipt of said shaft for said orbiting scroll;
(d) a bearing support means in which said main bearing and said thrust bearing are provided;
(e) a rotation-preventing mechanism which:
 (i) prevents said orbiting scroll from rotating on and around its axis and
 (ii) causes the same to revolve around said main bearing;
(f) an oil path which:

(i) is bored in and through said main shaft to define an oil-feeding port;
(ii) is open to an oil sump where the bottom end of said main shaft is immersed; and
(iii) feeds lubricating oil to said main bearing and said thrust bearing; and (g) a plurality of oil feeding grooves formed in the surface part of said thrust bearing in point symmetry with respect to the center point O of said thrust bearing, said oil feeding grooves being in the form of involute curves projecting from the center point O of said thrust bearing.

2. A scroll type compressor which comprises in combination:

(a) a stationary scroll and an orbiting scroll, each of which is constructed with a base plate and a wrap plate in a spiral form projectively provided on the surface of said base plate, both said scrolls defining a compression chamber by being mutually combined in an offset relationship;

(b) a main shaft which holds a shaft for said orbiting scroll provided at a side opposite to the wrap plate of said orbiting scroll by offsetting said shaft for said orbiting scroll for a predetermined quantity to cause said orbiting scroll to perform the orbiting motion, said main shaft being rotatably received in a main bearing;

(c) a thrust bearing which holds the surface of said base plate of said orbiting scroll at the side opposite to the surface where said wrap plate is provided, said thrust bearing having a center point O and a center opening for receipt of said shaft for said orbiting scroll;

(d) a bearing support means in which said main bearing and said thrust bearing are provided;

(e) a rotation-preventing mechanism which:
(i) prevents said orbiting scroll from rotating on and around its axis and
(ii) causes the same to revolve around said main bearing;

(f) an oil path which:
(i) is bored in and through said main shaft to define an oil-feeding port;
(ii) is open to an oil sump where the bottom end of said main shaft is immersed; and
(iii) feeds lubricating oil to said main bearing and said thrust bearing; and (g) a plurality of oil feeding grooves formed in the surface part of said thrust bearing in point symmetry with respect to the center point O of said thrust bearing, said oil feeding grooves being in the form of straight lines tangential to said center opening in said thrust bearing.

* * * * *